United States Patent [19]

Hoagland et al.

[11] 4,281,980
[45] Aug. 4, 1981

[54] EXPANSION DEFORMABLE EXTRUSION DIE BLADE

[75] Inventors: John C. Hoagland, Longmeadow; Peter H. Farmer, Springfield; Rocco M. Carabetta, Jr., East Longmeadow, all of Mass.

[73] Assignee: Monsanto Company, St. Louis, Mo.

[21] Appl. No.: 113,437

[22] Filed: Jan. 18, 1980

[51] Int. Cl.³ .............................................. B29F 3/04
[52] U.S. Cl. .................................. 425/461; 264/40.1; 264/176 R; 425/141; 425/143; 425/144; 425/192 R; 425/379 R; 425/466; 425/381
[58] Field of Search ........ 425/461, 466, 141, 143–144, 425/381, 378 R, 379 R, 192 R; 264/40.5, 40.4, 40.1, 176 R

[56] References Cited

U.S. PATENT DOCUMENTS

| | | | |
|---|---|---|---|
| 2,938,231 | 5/1960 | Lowey, Jr. | 425/466 |
| 3,261,893 | 7/1966 | George et al. | 425/141 |
| 3,767,346 | 10/1973 | Mihalik | 425/461 |
| 3,940,221 | 2/1976 | Nissel | 425/141 |
| 3,985,845 | 10/1976 | Akatsuka et al. | 264/40.5 |
| 4,003,689 | 1/1977 | Harrison et al. | 425/381 |
| 4,055,389 | 10/1977 | Hayward | 425/381 |
| 4,125,350 | 11/1978 | Brown | 425/381 |

Primary Examiner—Jeffery R. Thurlow
Attorney, Agent, or Firm—David Bennett; William J. Farrington; Edward P. Grattan

[57] ABSTRACT

A flexible lip die blade is provided in which local flexing of the blade is brought about by activation of heaters located in connector members connecting the flexible lip with the body of the die blade.

6 Claims, 4 Drawing Figures

EXPANSION DEFORMABLE EXTRUSION DIE BLADE

BACKGROUND OF THE INVENTION

This invention relates to die blades for use with extrusion dies of the type adapted to produce sheets of a thermoplastic polymer. It relates particularly to blades adapted for use in extrusion processes where it is important to maintain a careful control over the thickness of the extruded sheet.

The extrusion of a polymer between the lips of a sheet die gives a superficially uniform product but if the gauge is monitored, minor thickness variations are often found in the cross machine direction as well as in the direction of extrusion. These can be caused by uneven lip separation along the slit, different temperatures within the polymer melt such that the amount of swell that occurs as the polymer exits the slit varies, or the presence of minor inhomogeneities in the melt.

It is often important to produce a polymer sheet of great gauge uniformity so that the resolution of this problem of gauge variation can be a very significant commercial goal.

DISCUSSION OF THE PRIOR ART

The earliest approach to gauge control was to provide that one of the die lips be moveable in response to the adjustment of a plurality of jack-bolts located along its length so as to control the separation between the opposed lips. This approach however leaves a substantial time lapse between the identification of the gauge variation problem and its correction. Moreover, the adjustment is a matter of trial and error and needs much experience on the machine with specific polymers before it can be done with any degree of efficiency.

One approach to the control problem is to provide that at least one of the lips is flexible to the extent it can be locally deformed by physical pressure to provide local adjustment of the die gap. This approach was shown in U.S. Pat. No. 2,938,231 in which the jack bolts conventionally used to adjust the die gap thickness were elongated and provided with heater mechanisms such that activation of the heater mechanism associated with a bolt caused the bolt to expand and locally deform the flexible lip thus narrowing the slit at that point.

This approach was refined in U.S. Pat. No. 3,940,221 which added to the earlier device a cooling means associated with each bolt so as to permit adjustment by contraction as well as expansion of the bolt and therefore a more rapid response to the need for adjustment. One specific problem encountered with such gauge control devices is that of "stick-slipping", that is the tendency to resist the expansion forces and then, when a resistance threshhold has been overcome, moving suddenly by an amount that may well be excessive if only fine adjustment is needed. This problem is a serious limitation on the utility of such devices.

Additionally it is often found that if the bolts are reasonably close together and one is expanded substantially, the portion of the lip bearing against the next adjacent bolt may be removed from contact with the bolt so frustrating any minor adjustments needed at that location.

A final problem is that upon cooling of the bolt the contact between the lip and surface is often, at least initially, lost such that the cooling response is often very uneven.

Finally, such techniques also have the disadvantage that the spacing of the adjustment points is limited by the dimensions of the bolt and its associated heating and cooling means. Additionally the stick-slipping problem described above places limitations on the speed by which the device can respond accurately to a need for adjustment.

DESCRIPTION OF THE INVENTION

A new die blade has now been designed for use in the extrusion of thermoplastic polymer sheets of very closely controlled gauge. A die incorporating the die blade of the invention is capable of responding rapidly to any perceived gauge variations in such a way as to eliminate them. The die blade of the invention does not require the somewhat bulky heater/cooler mechanisms and responds quickly and efficiently to heating and cooling without "stick slipping". The invention comprises an integrally formed die blade having a body portion, a flexible lip portion and a plurality of elongated connector members each having one end rigidly connected to the body portion of the die blade and the other rigidly connected to the flexible lip and at least some of said connector members being provided with heater elements such that activation of any such heater element produces expansion of the connector member and a resultant local deformation of the flexible die lip in the region of the expanded connector member.

Because each connector member is rigidly attached to both the body member and the flexible lip the expansion and contraction of each results in an immediate local deformation of the flexible lip. While the connector members may be individually fixed to the die blade, it is often more convenient that they form part of a unified structure which is itself fixed to the die blade. A preferred example of such a unified structure is a plate with a ladder configuration, the cross members representing the connector members and the side members being rigidly attached, one to the body portion and the other to the flexible lip portion of the die blade.

It is a highly preferred feature of this invention that the connector member be made of a material with a low thermal conductivity, a good coefficient of expansion and high strength. Generally the thermal conductivity of the material for preferred connector members is not greater than 6 BTU/ft$^2$.hr. °F. (29.3 kg. cal/sec. cm$^2$. °C.), the coefficient of thermal expansion is at least $6.0 \times 0^{-6}$ in/in. °F. (10.8 cm/cm °C.) and the modulus of elasticity is preferably at least $25 \times 10^6$ lb/in$^2$ ($1.76 \times 10^6$ kg/cm$^2$). One suitable material is an alloy known as Hastelloy which comprises 0.1% C; 20% Cr; 10% Mo; 2% Co; 20% Fe; and the remainder (approx. 48%) Ni. and is available under that trade designation from Cabot Corporation. Other suitable materials include other ferrous alloys with similarly high chromium, molybdenum and nickel contents.

It is a further preferred feature that an insulating stratum lie between the connector member and the other die blade parts to minimize any heat flow from the connector member to the body of the die blade or the flexible lip portion.

The preferred ladder configuration of the connector members serves two critical functions. First of all it provides a rigid framework that insures that each connector member will be accurately and securely fixed in place. Secondly, the spacing of the connector members ensures that there will be minimal heat flow between the adjacent pairs so that each expansion effect will produce a highly localized deformation. This reduction of heat flow between adjacent connector members is of course further reduced by making the connector member from a low-conductivity material.

It is possible to provide that the heater elements is the connector members be activated by any suitable heater mechanism such as a circulating fluid or induction heating but the preferred means is an electrical heater element. While it is not necessary that every cross-member be provided with a heater element, this is a preferred feature of the invention.

In practice the spaces between the connector members can allow foreign material to collect in the die blade in the space between the body portion and the flexible lip. This can be avoided by placing a cover member of a low conductivity material over the connector members held by the same mounting devices that rigidly attach the members to the die body and flexible lip.

The die blade of the invention can be used in conjunction with a fixed die lip or an adjustable die lip of a similar or different design to provide an extrusion die orifice. Often it is desirable to provide that one of the die lips is designed to permit an initial cold alignment of the die lips to give the desired uniform opening. Any fine adjustment required during operation of the die can then be handled using the die blade of the invention.

In addition to a die formed by the cooperation of a stationary surface a design such as is illustrated in FIG. 4 of the drawings allows the die to be used in conjunction with a rotating roll to define a secondary die orifice that controls the thickness of the sheet by a similar mechanism.

The portion of the die blade in contact with the resin is preferably insulated from temperature fluctuations in the rest of the die blade by the provision of a heat barrier means disposed in the flexible lip. A most suitable form of the heat barrier means comprises a passage running the length of the die blade and adapted to circulate a heat transfer liquid at a constant temperature. This circulating liquid then absorbs the temperature variations generated by the temperature adjustment means and prevents them from affecting the melt temperature as it exits the die.

DESCRIPTION OF THE PREFERRED EMBODIMENTS

The invention is now further described with relation to the attached drawings which are for the purposes of illustration only and are intended to imply no limitation on the essential scope of the invention.

Figure 1:
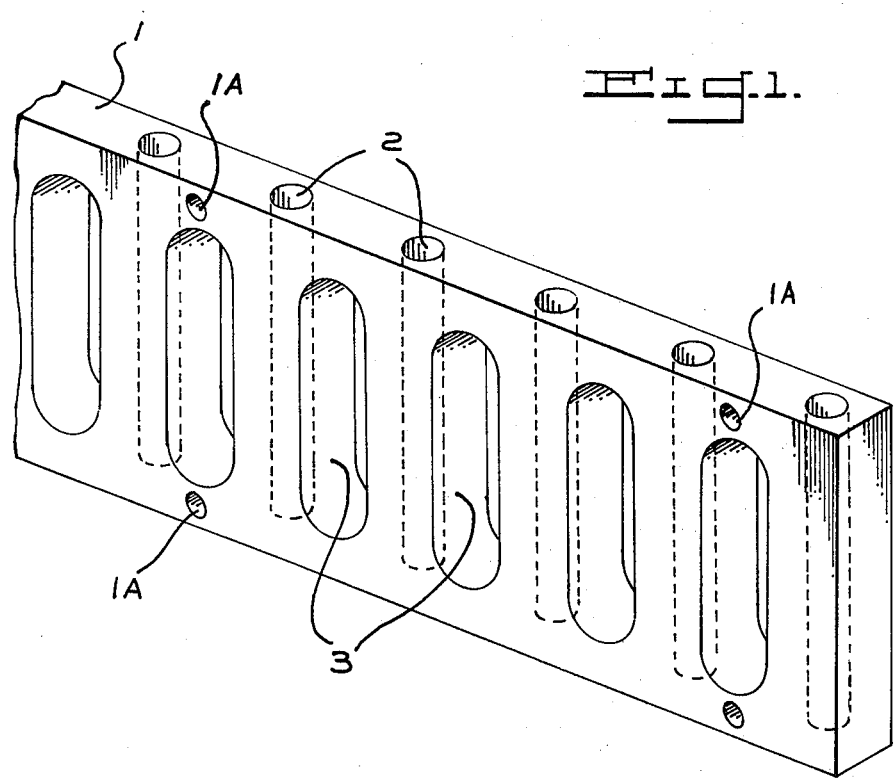
FIG. 1 is a perspective drawing of part of one embodiment of a connecting member as used in the die blade of the invention.

In the drawings FIG. 1 illustrates one embodiment of the central feature of the die blade of the invention, the connecting members. A body member, 1, incorporating the connector members, 3, is a rectangular plate of a low thermal conductivity, high tensile strength material. The strength is required to accommodate the internal stresses that result from one portion being expanded while an adjacent portion is not. The low thermal conductivity ensures that the heat flow along the member and to (or from) the die blade is as low as possible. Generally certain metal alloys meets these requirements so the connecting member is usually formed from an alloy plate.

A plurality of connector members, 3, are integral with the body member which assumes a ladder configuration with connector members joining two side members. Each connector member accommodates an electrical heater element, 2. The dimensions of this heater should be large enough to heat the connector member adequately while not affecting its structural function by impairing its strength. The heater power is usually less than 200 watts and is preferably 50-150 watts.

The side members are provided with holes, 1A, which cooperate with bolts or pins or the like to attach the connector members to the die blade.

Figure 2:
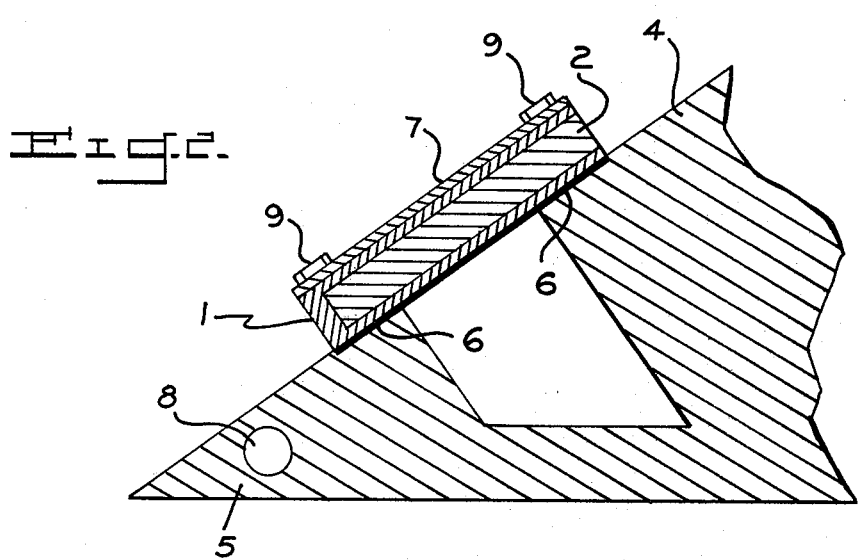
FIG. 2 is a cross-sectional view of a die blade of the invention.

FIG. 2 shows the body member of FIG. 1 in place on a die blade of the invention which comprises a body portion, 4, with a deformable lip, 5, which is integral with the die body and connected thereto by a relatively thin metal web such that the lip can move independently of the body portion by flexure of the web. The body member is seated on an insulating stratum, 6, which is usually made of a rigid temperature resistant, very low thermal conductivity material such as a woven glass mat or similar insulating material. The body member is rigidly fixed to the die blade by bolts, 9, which also serve to locate in place a cover member, 7, which overlays the connector members and prevents loose waste from collecting behind the body member. One of the side members of the body member is fixed to the body portion of the die blade and the other is attached to the flexible lip such that flexure of the web is normally precluded by the connector members.

A channel, 8, is provided in the flexible lip for circulation of a cooling medium designed to ensure that no temperature fluctuations in the die blade are communicated to the polymer melt flow that contacts the die lip when in use.

In the operation of the die blade of the invention identification of a non-uniformity in the sheet extruded through a slit die incorporating the die blade of the invention will trigger a response in the die blade tending to open or close the die gap at the point on the die corresponding to the non-uniformity so as to eliminate the non-uniformity. Thus if the non-uniformity is an increase in thickness, the heater element in the appropriate location in the connecting member is activated causing the connector member in which it is located to expand. Since the connector member is rigidly attached to the flexible lip, a corresponding deformation of the die lip will be produced and the die gap will be closed fractionally at that point. Reduction of the heat supplied to the heater results in a cooling and hence a contraction and a widening of the die gap at the position corresponding to that particular heater.

In practice the heaters all receive enough current to maintain a constant base temperature and the current supplied is increased or decreased from this constant level so as to provide both expansion and contraction possibilities.

Figure 3:
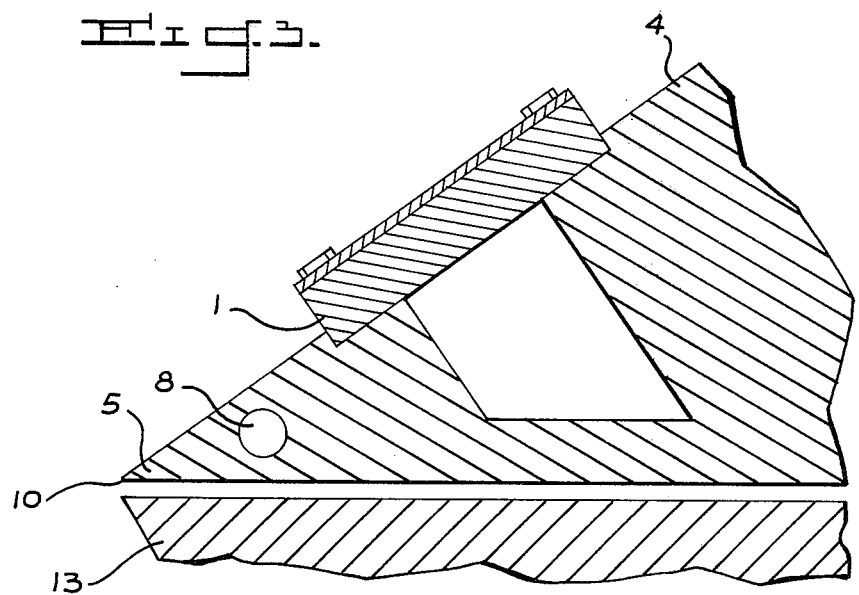
FIG. 3 is a simplified cross-section showing a slit die incorporating one form of the die blade of the invention.

FIG. 3 illustrates one embodiment of the invention in which the die blade comprising body portion, 4, and flexible lip, 5, cooperates with a fixed lip, 13, to define a slit die orifice. On activation of the heater elements in any connector member, the die lip, 10, is depressed to narrow the die orifice at that point.

Figure 4:
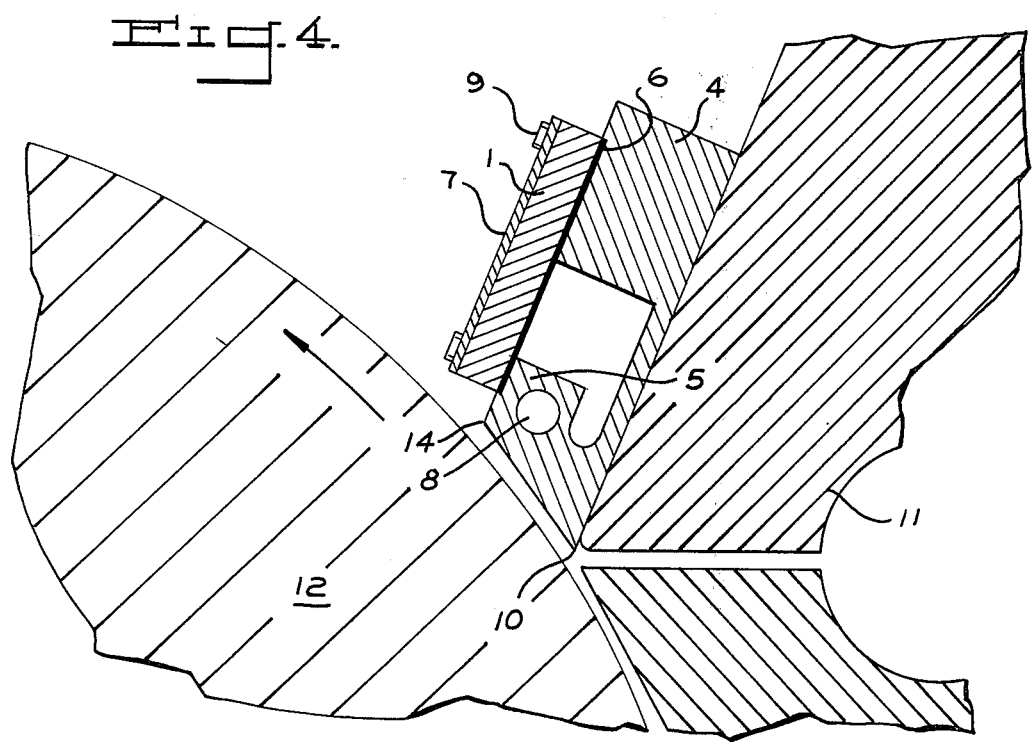
FIG. 4 is a partial cross-sectional view of a die blade of the invention used in conjunction with a die roll.

FIG. 4 illustrates an alternative embodiment in which the die blade is bolted to the die body, 11, and a roll, 12, is located in close proximity to the die body exit such that a molten polymer after exiting the die body passes along a passage defined by the die roll surface and the angled face of the flexible die lip. The "die orifice" then becomes in effect the slit between the edge, 14, of the flexible lip and the opposed surface of the roll. Activation of the heaters in the connector member now produce local deformations not at edge, 10, but at edge, 14. The effect however is the same in that the effective die orifice opening is varied in response to the local expansion or contraction of the connector member.

In use the roll moves past the die blade so as to carry the polymer away from the die as it is extruded and to impart to the surface of the sheet thus formed any desired texture.

It is understood that many minor variations and modifications could be made to the invention described herein without departing substantially from essential nature of the invention. It is intended that all such minor variations and modifications should be within the purview of this invention.

What is claimed is:

1. An integrally formed die blade having a body portion, a flexible lip portion and a plurality of elongated connector members each having one end rigidly connected to the body portion of the die blade and the other rigidly connected to the flexible lip and at least some of the said connector members being provided with heater elements such that activation of any such heater element produces expansion of the connector member and a resultant local deformation of the flexible die lip in the region of the expanded connector member.

2. A die blade according to claim 1 in which the connector members are provided by the cross-members of a plate having a ladder configuration the longitudinal members of which are rigidly attached, one to the die body and one to the flexible lip.

3. A die blade according to claim 2 in which the connector members are fabricated from a material with a thermal conductivity that is not greater than 29.3 kg. cal/sec/cm$^2$. °C., a coefficient of thermal expansion of at least 10.8 cm/cm °C. and a modulus of elasticity of at least $1.75 \times 10^6$ kg/cm$^2$.

4. A die blade according to either of claims 2 or 3 in which a rigid insulating material is interposed between the connecting members and the portions of the die blade to which they are bolted.

5. A die blade according to either of claims 2 or 3 in which a cover member is attached to the die blade such that the connector members lie between the cover member and the die blade.

6. A die blade according to either of claims 2 or 3 in which a heat barrier means is provided in the flexible lip portion for maintaining the temperature of the lip substantially independent of temperature variations in the connector members and the body portion.

* * * * *